455-617 AU 233 EX
FIP8106 XR 3,674,925

United Stat
Heckman, Jr.

[15] 3,674,925
[45] July 4, 1972

[54] CABLE-LESS TELEVISION SYSTEM

[72] Inventor: Paul J. Heckman, Jr., Rancho Santa Fe, Calif.

[73] Assignee: The United States of America as represented by the Secretary of the Navy

[22] Filed: Dec. 3, 1970

[21] Appl. No.: 94,659

[52] U.S. Cl.......................178/6.8, 178/DIG. 1, 178/DIG. 8, 178/DIG. 38, 250/199

[51] Int. Cl.......................H04n 7/02

[58] Field of Search...........250/199; 178/DIG. 1, 29, DIG. 8, 178/DIG. 38, 6.8

[56] References Cited

UNITED STATES PATENTS

| | | | |
|---|---|---|---|
| 3,578,907 | 5/1971 | Stock et al. | 178/7.88 |
| 3,258,595 | 6/1966 | Galante | 250/199 |
| 2,472,889 | 6/1949 | Du Mont | 250/199 X |
| 1,984,673 | 12/1934 | Du Mont | 250/199 X |

*Primary Examiner*—Robert L. Griffin
*Assistant Examiner*—Richard K. Eckert, Jr.
*Attorney*—Richard S. Sciascia, Ervin F. Johnston and John Stan

[57] ABSTRACT

This invention relates to apparatuses and methods for enabling surveillance of a distant target from a remote viewing point which does not require a cable or acoustic signals between the target and the viewing point. The apparatus at the target includes a light source, for example, a laser, for illuminating the target, and which may be modulated by any of various known techniques, at a frequency in the range of 3 kHz or more. A TV camera tube, which observes the target, generates a conventional composite video signal, including horisontal and vertical blanking pulses, the bandwidth of the video system being at least 50 kHz. A light source modulator connected between the light source and the TV camera tube, modulates the light source in accordance with the variation in amplitude of the composite video signal.

The apparatus at the remote viewing point includes a lens for focusing the light from the target, remote light source, and any scattered light from the medium in which the target is located, and a photodetector for receiving the light focused by the lens. A frequency-compensating amplifier, connected to the photodetector, compensates for any drop in high-frequency response to the photodetector. A demodulator, connected to the output of the frequency-compensating amplifier, demodulates the modulated composite video signal, and, in effect, decodes the video information. A TV monitor, connected to the output of the pulse-time demodulator, permits observing the target at the viewing point remote from the target.

12 Claims, 4 Drawing Figures

(PRIOR ART) CONVENTIONAL TV SYSTEM FOR UNDERWATER SURVEILLANCE.

CABLE-LESS TV SYSTEM FOR UNDERWATER SURVEILLANCE.

INVENTOR.
PAUL J. HECKMAN, JR.,
John Stan AGENT
By Erwin F. Johnston
ATTORNEY.

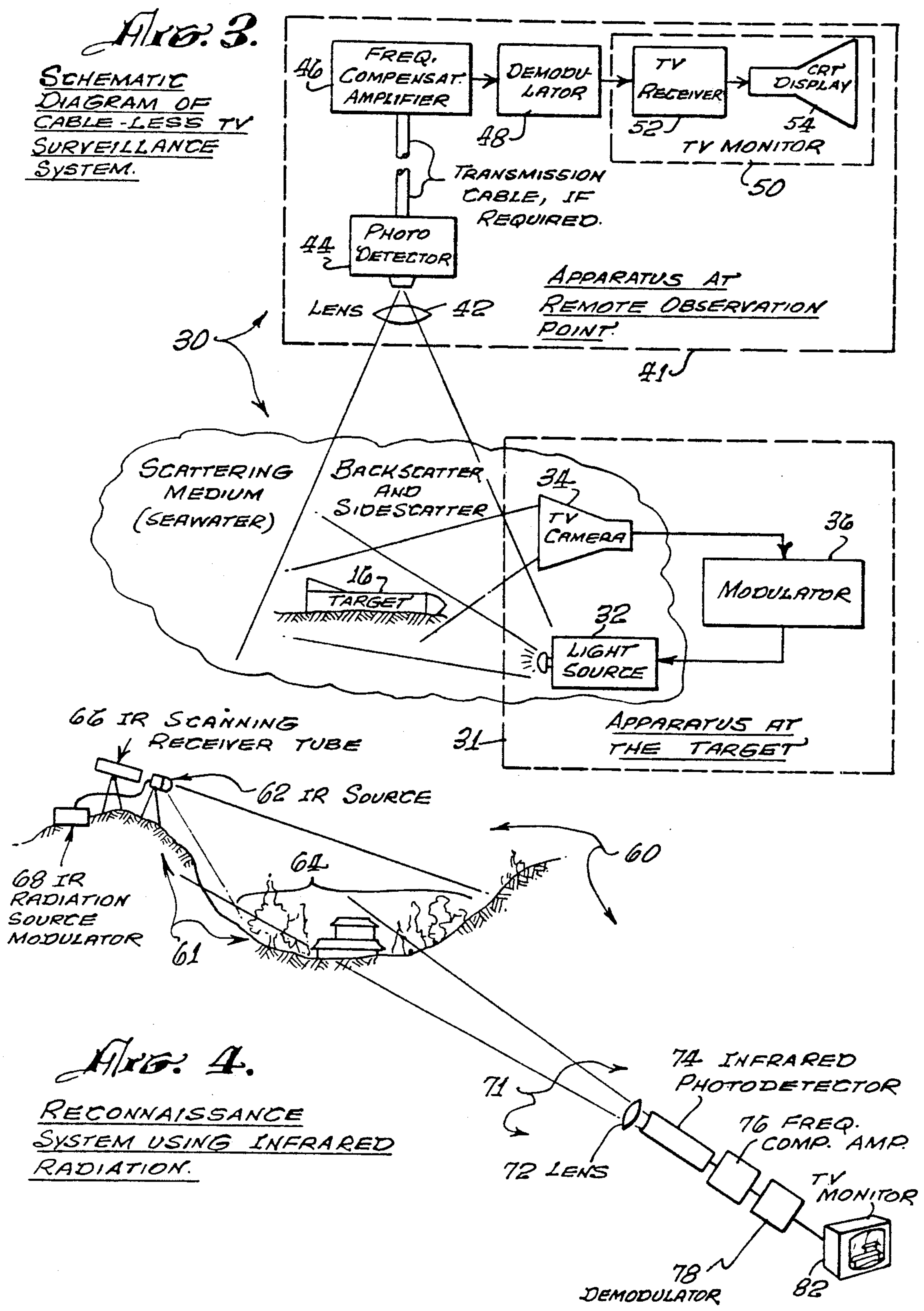
FIG. 3. SCHEMATIC DIAGRAM OF CABLE-LESS TV SURVEILLANCE SYSTEM.
FIG. 4. RECONNAISSANCE SYSTEM USING INFRARED RADIATION.

CABLE-LESS TELEVISION SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to apparatuses and methods for enabling surveillance of a target from a remote viewing point, which does not require a cable or acoustic signals between the target and the viewing point. The apparatus at the target includes a light source, a TV camera tube, and a light source modulator connected between the camera tube and the light source.

The apparatus at the remote viewing point includes a lens for focusing the light from the target and a photodetector for receiving the light focused by the lens. A frequency-compensating amplifier is connected to the high-gain photodetector circuit to compensate for high-frequency roll-off of video information. A TV monitor connected to the output of the amplifier permits viewing the target at the remote viewing point.

DESCRIPTION OF THE PRIOR ART

In the prior art apparatus of this type, usually the ocean floor is surveyed, searched, or photographed by means of an optical system comprising a TV camera and a light source, which is often remote from the TV monitor readout. The TV camera may be connected by hundreds, even thousands, of feet of cable between the viewing point and the target observed by the camera tube. Use of the cable creates drag, weight and cable-handling problems.

There are presently in use underwater surveillance systems using a cable between a surface ship and a vehicle which views the target. Significant degradation of TV data signals take place at depths of 7,000 feet. Attempts to design systems for much greater depths have been unsuccessful, due either to prohibitive increases in the size of the cable or loss of resolution to the point of precluding satisfactory operational performance.

Other approaches to long-line underwater TV transmission exist, but the state of the art is not sufficiently advanced. Transmission is accomplished by (1) reducing the scan rate of the picture to present a non-real time picture, which is often a poor quality picture; and (2) reducing transmission loss by using large coaxial cables.

Another solution to the problem is by transmitting video acoustic signals from the target to the remote monitoring location, or remote viewing point. This is not possible, however, with the present state of technology, because of the 4 megahertz bandwidth required for the video signals. The higher frequencies would be too greatly attenuated in the water to allow a practical reconstruction of the original data. In addition, a sophisticated acoustic array, and a tremendous amount of additional electrical power would be required at the transmitting end, that is, aboard the search vehicle from which the target is being observed. However, the only presently available means of transmitting standard TV video signals through the water is through expensive, non-hosing, armored, underwater coaxial cables.

SUMMARY OF THE INVENTION

This invention relates to an apparatus and method for enabling surveillance of a target from a remote observation point, which does not require a cable or acoustic signals between the target and the observation point, nor does it require an additional light source for transmitting the information optically. The TV camera is identical to the one used in the prior art conventional system. However, the output of the TV camera, which is the composite video output consisting of a video signal plus the horizontal and vertical pulses, is fed directly to a modulator unit, where frequency-compensating circuitry coupled to modulating networks are used to vary the input voltage to the light source.

The light source is thus used for two distinct purposes. First, it is used to illuminate the target area. This is the normal function of a light source. Secondly, it is used as the transmitter of the composite video signal. The modulated light is not a hindrance to the observing capabilities of the TV camera because the modulated signal is integrated by the photosensitive surface of the TV camera. Thus, any flicker of the light caused by the modulated signal is not seen on the camera output signal. In this invention, advantage is taken of the fact that the image target of the camera tube is an integrating mechanism, but the photodetector is not.

The video bandwidth may range between 50 kHz and 4 MHz, with the lower end of the range requiring a much lower line scanning rate.

A filament-type light source cannot be used with the invention because of the considerable time lag between the application of power to the light source and the corresponding change in light intensity, unless an external optical modulator were provided. However, the concept in back of the invention is easier to understand if we assume the existence of an ideal light source of the filament type where there is no time delay between the application of energy to the light source and the consequent change in light intensity. In such an instance, the light source would vary in power output only, and therefore in intensity, the variation being similar in form to the variation shown by a conventional video signal as used in a standard TV system. This variation in intensity is what the phototube located on the support ship must detect, and the positioning or orientation of the photodetector is not at all critical. A lens system focused upon the combined light source and target area would, in turn, focus the received light upon the sensitive area of the photodetector. The required accuracy in focusing is well within the present state of the art.

With the present state of the art, it may not be possible to modulate a non-laser light source at a 4 MHz rate. However, this rate is not essential, inasmuch as satisfactory video response may be obtained at a much lower rate.

While a laser light source may be amplitude-modulated, for example, with the aid of a Kerr cell or Pockels cell, however, pulse-time modulation (PTM) may be preferable, including pulse-duration modulation (PDM) or pulse-position modulation (PPM). A pulse-type modulation must be employed in most cases, since the energy of the light source commonly used, whether an argon or xenon bulb, or a laser light source, must be turned on and off more or less instantaneously, due to their characteristics of operation.

The video signal may then be picked up at a remote viewing point, for example, at a surface support ship, by placing a photomultiplier, or other type of photodetector, beneath the surface of the ocean, and focusing, by means of a lens, the entire area encompassing the illuminator and the illuminated target area.

The output of the photodetector is then sent through frequency-compensating amplifiers, and a demodulator, to a TV monitor. The viewer then sees the picture taken by the television camera of a target located near the ocean floor, without the use of cables or cable-handling equipment.

An advantage of using this type of system is that the photomultiplier tube can have several orders of magnitude more sensitivity than an ordinary TV image pickup tube. That is, if an ordinary image tube were placed at the support ship using a light source located near the ocean floor, the lower sensitivity of the image tube would not allow for the range attainable with a photomultiplier tube. Also, the lens system of an image-type device would have to have extreme magnification and be located in a very stable platform to see this same magnified area on the bottom. In addition, the image could not possibly be seen from the distances possible with the embodiments of this invention because of the backscattering and forward scattering which occurs in a medium such as water or a fog. Thus, the resolution and magnification could not possibly be as good as the systems of this invention.

Because of the enormous velocity of light waves and the relatively slight distance to the target, and the much smaller distances involved in the area of illumination, for all practical purposes it can be assumed that light from all parts of the illuminated area reaches the lens system at the same time, and therefore the received video signal is not degraded in sharpness due to any varying delay caused by a difference in distance traversed by the video signals.

STATEMENT OF THE OBJECTS OF INVENTION

One object of the invention is to provide an apparatus and method for surveillance of an underwater target from a remote observation point without the use of an expensive, armored, underwater coaxial cable.

Another object of the invention is to provide a surveillance system not requiring a sophisticated acoustic array, and a tremendous amount of electrical power to produce acoustic signals.

Still another object of the invention is to provide a surveillance system where it is not feasible to have a cable connection between the location of the TV camera and the remote observation point, for example, at areas above ground where it would be dangerous to have a cable connection between the two.

BRIEF DESCRIPTION OF THE DRAWINGS

FIGS. 2 and 3 are a pictorial view and a schematic view, respectively, of one embodiment of the cable-less TV system of this invention used for underwater surveillance.

FIG. 4 is a schematic diagram of another embodiment of a cable-less TV surveillance system, not used in an underwater environment.

DESCRIPTION OF THE PREFERRED EMBODIMENTS

Figure 1:
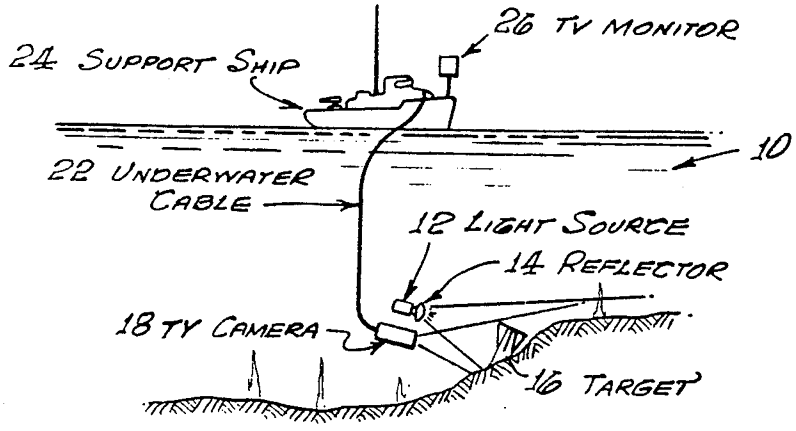
FIG. 1 is a pictorial view of a prior art TV system for underwater surveillance.

Discussing first, in more detail, a prior art system, there is shown in FIG. 1 a conventional TV system 10 for underwater surveillance. A light source 12, having a reflector 14, illuminates a target 16. A TV camera 18, of a conventional type adapted for underwater use scans the area of target 16. The TV camera 18 generates a conventional video signal, including horizontal and vertical blanking pulses.

An underwater cable 22 transmits the composite video signal to a remote viewing point, for example, on support ship 24. It will be understood that, due to the capacitance in the cable, it is extremely difficult to conduct high-bandwidth TV information over a length greater than several hundred feet. The higher video frequencies become too greatly attenuated in the water to allow visual reconstruction of the target 16 area with the required video fidelity.

Figure 2:
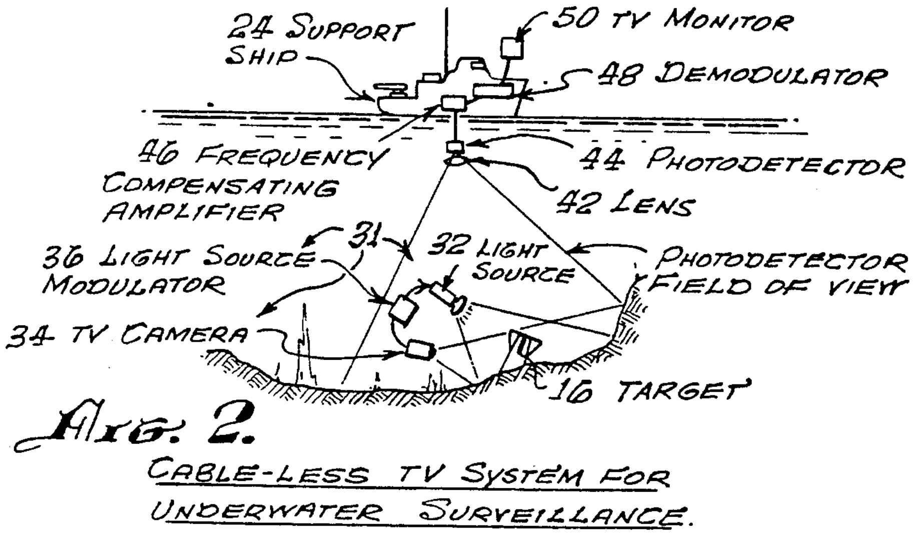

FIG. 2 shows a diagrammatic view and FIG. 3 a schematic-diagrammatic view of an apparatus 30 and method of this invention for enabling surveillance of a target 16 from a remote viewing point, for example, on support ship 24, which does not require a cable or acoustic signals between the target and the viewing point.

The apparatus 31 at the target includes a light source 32, whose intensity may be varied at a frequency in the range of 3 kHz or more. A laser source, if used, may be modulated at a much greater frequency than 3 kHz, however, it may be desirable to use a xenon or argon light source.

It will be noted that in the embodiment of the present invention, the reflector 14 of the prior art, as shown in FIG. 1, is not required. A reflector is not used to shield the light source 32 so that the maximum amount of light from the light source is available at the distant observation point.

A TV camera tube 34, which views the area of the target 16, generates a conventional composite video signal, including horizontal and vertical blanking pulses, the bandwidth of the video system being at least 50 kHz.

A modulator 36, for example, pulse time modulator, connected between the light source 32 and the TV camera tube 34, modulates, e.g., pulse-time modulates, the intensity of the light source in accordance with the variation of amplitude of the composite video signal.

The apparatus 41 at the remote viewing point, which would be stationed on a ship 24 if the apparatus be used for underwater surveillance, includes a lens 42 for focusing the light from the area of the target 16, remote light source 32, and any scattered light, whether backscattered or sidescattered, from the medium in which the target is located. A photodetector 44 receives the light focused by the lens 42.

A frequency-compensating amplifier 46 is connected to the output of the photodetector 44, for compensating for any drop in high frequency response of the photodetector. Of course, low-frequency compensating amplifiers may also be used if required. A demodulator 48, for example, a pulse-time demodulator, connected to the output of the frequency-compensating amplifier 46, demodulates the modulated composite video signals. A TV monitor 50, comprising a TV receiver and a cathode-ray tube (CRT) display 54, connected to the demodulator 48, permits viewing the target 16 at a location remote from the target.

FIG. 4 shows another embodiment of a reconnaissance system 60 using infrared (IR) radiation, wherein the apparatus 61 in the target area 64 comprises an infrared radiation source 62, for example, a carbon dioxide laser emitting at 10 microns, which illuminates the target area which is to be observed. An infrared scanning receiver tube 66 views the target area 64 and generates a conventional composite video signal, including horizontal and vertical blanking pulses, the bandwidth of the video signal being at least 50 kHz. An IR radiation source modulator 68 is connected between the IR radiation source 62 and the IR scanning tube 66, and modulates the intensity of the radiation source, for example, by pulse-time modulation, in accordance with the variation of amplitude of the composite viaeo signal.

The surveillance apparatus 60 at the observation point 71 comprises a lens 72 for focusing the IR radiation from the tartet area 64, remote IR radiation source 62, and any scattered IR light from the medium in which the target is located. An infrared photodetector 74, such as a mercury-doped germanium, receives the IR radiation focused by the lens 72.

A frequency compensating amplifier 76, connected to the IR photodetector 74, compensates for any drop in high-frequency response of the IR photodetector. A demodulator 78, for example, a pulse-time demodulator, is connected to the output of the frequency compensating amplifier 76 for demodulating the modulated composite video signal. A TV monitor 82 is connected to the demodulator 78 for viewing the target area.

In a more sophisticated embodiment, several photomultiplier receivers could be monitoring the same target area from different stations. This could be done from stations on the surface or from undersea habitats or relay stations.

Another alternative embodiment involves the use of several receivers using photodetectors, whose output could be used for integrating out the background noise and improving the receiver signal-to-noise ratio.

In another alternative embodiment, the light source used for telemetry would be different and more directional than the source used for illumination. It would be feasible, also, to modulate several lights on a given vehicle. This would provide a stronger source of signal for the photomultiplier to detect.

Of course a longer cable could be used between the support ship and the photomultiplier receiver to allow for larger distances between the camera and monitor.

Obviously many modifications and variations of the present invention are possible in the light of the above teachings. It is therefore to be understood that within the scope of the appended claims the invention may be practiced otherwise than as specifically described.

What is claimed is:

1. Apparatus for enabling surveillance of a target from a remote viewing point, not requiring a cable or acoustic signals between the target and the viewing point, the apparatus at the target comprising:

a light source, for illuminating the target area, whose intensity may be varied;

a TV camera tube, positioned to receive the light reflected from the target area, which generates a conventional composite video signal, including horizontal and vertical blanking pulses;

a light source modulator, connected between the light source and the TV camera tube, for modulating the intensity of the entire light source uniformly in accordance with the variation of amplitude of the composite video signal generated by the TV camera tube.

2. The surveillance apparatus according to claim 1, wherein the apparatus at the viewing point remote from the target comprises:

a lens for focusing the light from the distant target, the light source and any scattered light from the medium in which the target is located;

a photodetector for receiving the light focused by the lens;

a demodulator, connected to the output of the photodetector, for demodulating the modulated composite video signal; and a TV monitor connected to the demodulator, for viewing the distant target.

3. The apparatus according to claim 2, wherein the light source is a laser source; and the light source modulator and demodulator are pulse-time devices.

4. The apparatus according to claim 3, wherein the pulse-time modulator and demodulator comprise a pulse-duration modulator and demodulator.

5. The apparatus according to claim 3, wherein the pulse-time modulator and demodulator comprise a pulse-position modulator and demodulator.

6. The apparatus according to claim 2, wherein the light source is a laser light source; and the light source modulator and demodulator are amplitude-modulated devices, using a Kerr cell.

7. The surveillance apparatus according to claim 1, wherein the intensity of the light source may be varied at a frequency as high as 3 kHz or more; and wherein the bandwidth of the video signal generated by the camera tube is at least 50 kHz.

8. The surveillance apparatus according to claim 2, further comprising:

a frequency-compensating amplifier, connected between the photodetector and the demodulator, for compensating for any drop in the high-frequency response of the photodetector.

9. Apparatus for enabling surveillance of a target from a remote viewing point, not requiring a cable or acoustic signals between the target and the viewing point, the apparatus at the target comprising:

an infrared (IR) radiation source, for illuminating the target area with IR radiation, whose intensity may be varied at a frequency as high as 3 kHz or more;

an IR scanning receiver tube, positioned to receive the light reflected from the target area, which generates a conventional composite video signal, including horizontal and vertical blanking pulses, the bandwidth of the video signal being at least 50 kHz;

an IR radiation source modulator, connected between the IR radiation source and the IR scanning tube, for modulating the intensity of the entire IR radiation source uniformly, for example, by pulse-time modulation, in accordance with the variation in amplitude of the composite video signal generated by the IR scanning receiver tube.

10. The surveillance apparatus according to claim 9, wherein the apparatus at the viewing point comprises:

a lens for focusing the IR radiation from the distant target, IR light source and any scattered IR radiation from the medium in which the target is located;

an IR photodetector for receiving the IR radiation focused by the lens; a frequency-compensating amplifier, connected to the IR photodetector, for compensating for any drop in high-frequency response of the IR photodetector;

a demodulator, for example, a pulse-time demodulator, connected to the output of the frequency-compensating amplifier, for demodulating the modulated composite video signal; and a TV monitor, connected to the demodulator, for observing the distant target.

11. A method for enabling surveillance of a target from a remote viewing point, not requiring a cable or acoustic signals between the target and the remote point, the method at the target comprising the steps of:

illuminating the target by a light source whose intensity may be varied at a frequency in the range of 3 kHz or more;

observing the target area by a TV camera tube, positioned to receive the light reflected from the target area, which generates a conventional composite video signal, including horizontal and vertical blanking pulses, the bandwidth of the video signal being at least 50 kHz; and connecting a light source modulator between the light source and the camera tube, in order to uniformly modulate, for example, by pulse-time modulation, the entire light source in accordance with the variation in amplitude of the composite video signal generated by the TV camera tube.

12. The method according to claim 11, wherein the method at the remote viewing point comprises the steps of:

detecting the modulated variations in the intensity of the light source by means of a lens focusing the light variations upon a photodetector;

compensating for the frequency with a frequency-compensating amplifier, connected to the photodetector, which compensates for any drop in the high-frequency response of the photodetector;

demodulating, for example, by pulse-time demodulation, the compensated output of the frequency-compensating amplifier; and viewing the distant target on a TV monitor connected to the output of the demodulator.

* * * * *